United States Patent [19]

Laureau

[11] 3,972,477
[45] Aug. 3, 1976

[54] WATERING APPARATUS HAVING AUTOMATIC FEED

[76] Inventor: Maurice Laureau, 7, Rue du Lieutenant Boulay, Pringy, 77310 Saint Fargeau Ponthierry, France

[22] Filed: Mar. 3, 1975

[21] Appl. No.: 554,544

[30] Foreign Application Priority Data

Mar. 1, 1974 France .............................. 74.07096

[52] U.S. Cl. ............................... 239/183; 137/344
[51] Int. Cl.² ........................................... B05B 3/18
[58] Field of Search ........... 239/183, 212, 188, 189, 239/184; 137/344; 60/413

[56] References Cited
UNITED STATES PATENTS

| | | | |
|---|---|---|---|
| 1,761,191 | 6/1930 | Browning | 239/189 |
| 2,628,476 | 2/1953 | Grier | 60/413 X |
| 3,385,315 | 5/1968 | Decoto et al. | 137/344 |
| 3,444,941 | 5/1969 | Purtell | 137/344 X |
| 3,477,643 | 11/1969 | Bruninga | 239/189 X |
| 3,575,200 | 4/1971 | Imeson | 137/344 |
| 3,687,372 | 8/1972 | Badcock | 239/189 X |
| 3,710,818 | 1/1973 | Imeson | 137/344 |
| 3,892,283 | 7/1975 | Johnson | 60/413 X |

Primary Examiner—Evon C. Blunk
Assistant Examiner—Michael Mar
Attorney, Agent, or Firm—Haseltine, Lake & Waters

[57] ABSTRACT

A standpipe or water distributor having automatic engagement and disengagement with a hydrant is mounted on a sled and is connected to a watering vehicle by a flexible conduit wound on a reel mounted on the vehicle. The sled and standpipe is displaced by winding the conduit on the reel. A hydropneumatic accumulator is mounted on the sled and serves to provide hydraulic pressure to open the valve for water feed from the hydrant and to unlock the standpipe from the hydrant when the watering is completed. The drive force for rotating the reel during periods of traction of the sled towards the stopped vehicle is effected by an engine on the vehicle.

7 Claims, 3 Drawing Figures

3,972,477

WATERING APPARATUS HAVING AUTOMATIC FEED

FIELD OF THE INVENTION

The invention relates to watering apparatus with continuous displacement and more particularly the feed of water to such apparatus.

BACKGROUND OF THE INVENTION

There is already known such continuous watering apparatus notably that described in French application, Ser. No. 7,302,528. This apparatus is displaced with a continuous movement over the length of a rigid pipe having a series of successive hydrants and it is fed with water in a continuous manner in time, at least two standpipes automatically engageable and disengageable and acting automatically to open the valve of the hydrant, at least one of the two standpipes being always connected to one hydrant and the two standpipes each being separately connected to the mobile apparatus by means of a flexible or articulated conduit.

In an apparatus of this type the continuity in time of the water feed for irrigation is not absolutely necessary so long as there is assured continuity of feed in space. At the time of interruption of water feed the vehicle can be stopped thereat and the water feed should be reinstituted in such manner that the watering takes place exactly in the region where it was stopped. In contrast with the apparatus described in the aforesaid patent it is necessary to assure continuity in time of the feed under pressure simultaneously for the feed of the distributor assuring after automatic engagement of the standpipe on the hydrant, the feed of the jack which actuates the opening of the valve of the hydrant and for the feed of the jack for automatic disengagement of the hooks to free it from the rearmost hydrant in order to permit its return.

The principal disadvantage of this arrangement precisely resides in the use of two standpipes and in the difficulties which result from this to assure their guiding, crossing and their continuous connection with the vehicle this only permitting in practice the utilization of a relatively low spacing between the hydrants of the order of 10 meters.

SUMMARY OF THE INVENTION

An object of the invention is to provide an apparatus which is much more simple and always assures automatically the feed of the water at least with the continuity in space in the sense defined hereinabove and which also permits an increase to a substantial degree of the spacing between the hydrants in order to also simplify the fixed installation.

The invention contemplates the utilization of one standpipe which is automatically engageable and disengageable by hydraulic control of the type described in the aforesaid French patent. The single standpipe is carried on a sled or carriage which is capable of following the path of the fixed waterpipe with the hydrants. The standpipe is vertically and axially moveable and is coupled to the watering vehicle by means of a flexible conduit of great length which is wound on a reel having an axial outlet. The return displacement of the standpipe and the sled on which it is supported is assured during periods of stoppage of the watering through the action of the winding of the reel. The continuity in time of the feed under hydraulic pressure for activating the jack for opening the valve and that of releasing the automatic locking means with the hydrant is assured by means of a hydropneumatic accumulator carried by the watering vehicle. The drive force necessary to activate the reel during the periods of traction of the sled towards the stopped watering vehicle is effected by an engine.

According to a particular feature of the invention a single, flexible, small conduit is disposed in the interior of the aforesaid flexible conduit and permits by means of a hydraulic assembly to insure simultaneously the remote control of the disengagement jack of the standpipe from the watering vehicle at the time of encouter with a subsequent hydrant and the remote control from the sled of the stoppage of the engine on the vehicle when the standpipe is engaged on a new hydrant.

DETAILED DESCRIPTION

Figure 1:
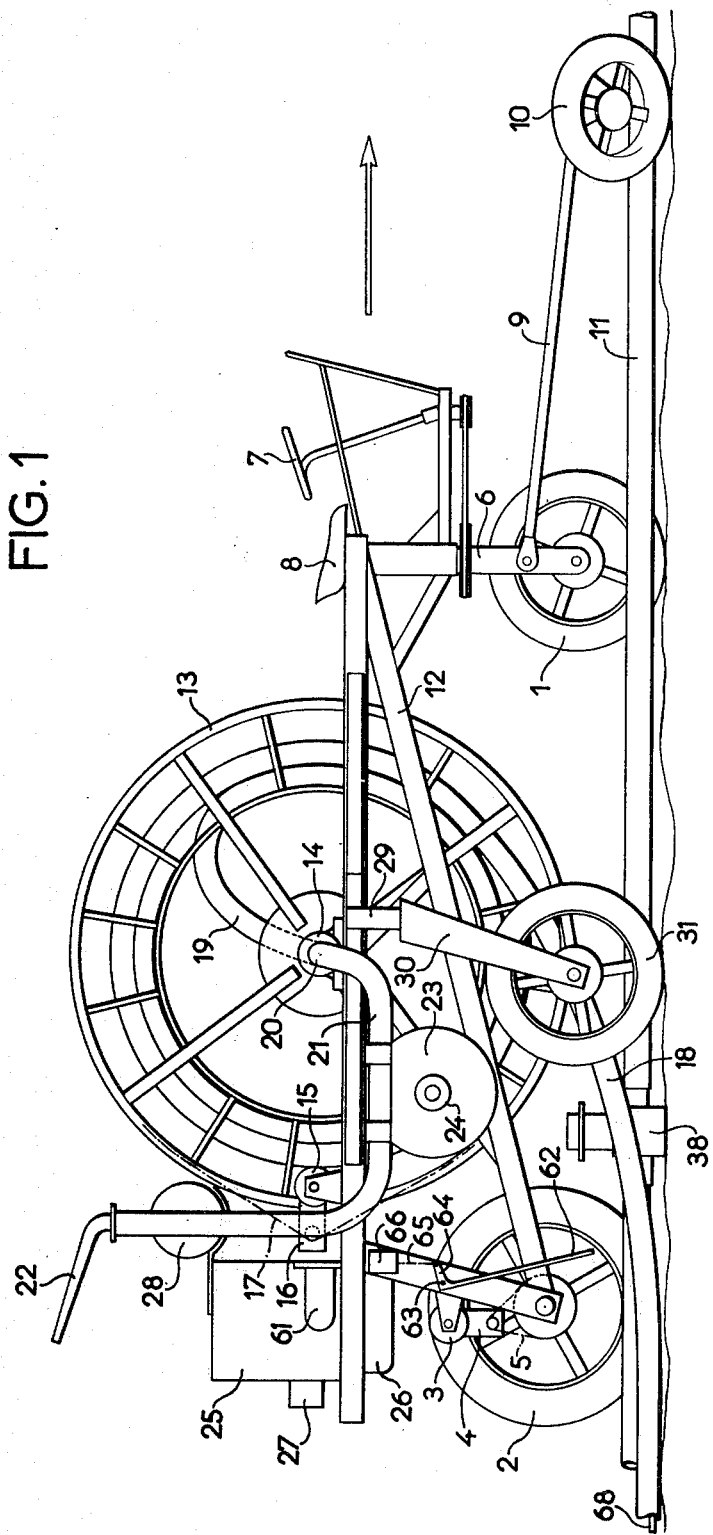
FIG. 1 is an elevation view of a watering vehicle according to the invention.

As shown in FIG. 1, the watering vehicle according to the invention comprises a front steerable wheel 1 and a rear drive wheel 2 driven from a hydraulic motor 3 through a gear reducer 4 and a transmission chain 5. The front steerable wheel 1 can be pivoted around a vertical axis under the action of a manual steering wheel 7 placed in front of a seat 8 and on the other hand under the effect of a raisable boom 9 carrying, at its front extremity, two small wheels 10 having oblique axes and rolling on the ground on opposite sides of a rigid water feed pipe 11. The above elements are mounted as an assembly on a chassis 12 which is relatively narrow in the transverse direction and which carries a large reel 13 which is rotatable about a central hollow axle 14 and is capable of being driven in rotation by a hydraulic motor 15 through a gear reducer 16 and a transmission chain 17.

On the reel 13 is wound a great length, for example, about 100 meters of a flexible conduit 18 which is resistant to pressure and constituted, for example, of polyethylene pipe, one extremity 19 of which is coupled to the hollow axle 14. The other extremity of the axle has a rotatable joint 20 by which it is connected to a conduit 21 having at its free end a water spraying device constituted, for example, by a simple nozzle 22 or other similar device. A hydraulic turbine 23 is connected to the conduit 21 in order to drive a hydraulic pump 24 mounted on the axle of the turbine.

An engine 25 is mounted at the rear of chassis 12 and is fed with fuel from a tank 26 to drive an oil pump 27. An oil reservoir 28 is connected to the pumps 24 and 27 to feed the same and the reservoir is connected to the return lines of the two hydraulic motors 3 and 15.

The described assembly is relatively flat and constructed in such manner that the two wheels 1 and 2 roll immediately adjacent pipe 11, whereas the reel 13, which represents the major part of the weight, is disposed on the side opposite pipe 11 in order that the conduit 18 will be placed on or adjacent the pipe 11. The assembly is relatively narrow and can easily travel in cultivated land, even between crops of great height, such as corn, while passing between two rows thereof.

The assembly is simply connected by a cross-bar 29 and a fork 30 to a third wheel 31 disposed at a particular distance from the aforesaid flat assembly to roll between two other rows of crop, the cross-beam 29 being disposed sufficiently high, optionally by means of a gantry, so as not to damage the intermediate crop.

Figure 2:
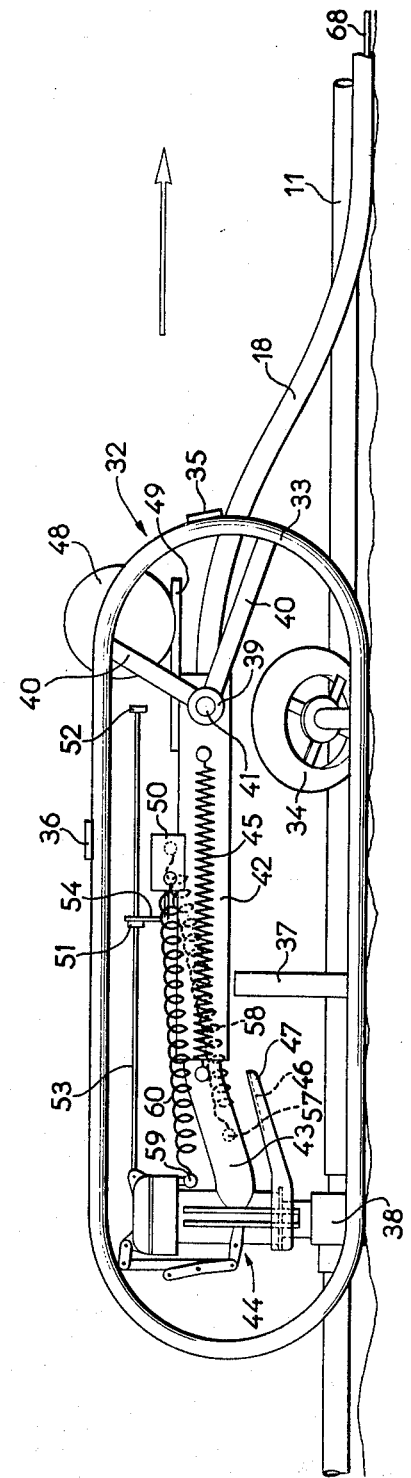
FIG. 2 is an elevation view of a sled coupled behind the watering vehicle.

At the other extremity of the flexible conduit 18, there is connected a sled or trailing vehicle 32 shown in FIG. 2 and formed by two lateral frames 33 constituted of any suitable shaped metal element. The frames rest on the ground on opposite sides of the pipe 11 for sliding on the ground and optionally the frames are provided at the front of the sled with a pair of small wheels 34 having inclined axis for rolling on opposite sides of the pipe 11. The two frames 33 are connected by cross braces which in FIG. 2 are three in number of which the first is shown at 35 at the front, the second at 36 at the top and the third at 37 connecting the lower median portions of the flanges. The third frame 37 is arched upwardly in order to clear water hydrant 38. These hydrants are of the type described in French application Ser. No. 7302528 and are connected at spaced locations along the pipe 11 a distance of about one hundred meters thereon which is substantially the length of the conduit 18.

The sled comprises two bearings 39 each connected by an arm 40 to one of the frames 33 to permit the rotation of a transverse horizontal axle 41 fixed to an alongated section 42 of a steel tube in which is telescopically mounted another tube 43, with a sealing joint (not shown) effecting sealing between the tubes in the course of their axial sliding movement. A device (not shown) constituted, for example, by a cable placed in the interior of the assembly of the telescopic tubes having opposite extremities connected to the respective tubes to limit the degree of extension of the telescopic tubes with respect to one another in order to avoid their separation. Any other suitable system of limiting the length can be also utilized.

At its front extremity near the axle 41, the exterior tube 42 is sealably connected to the extremity of the flexible conduit 18, for example, by locking of the conduit by means of collars on a mouthpiece of conventional type. The rear extremity of the interior tube 43 is rigidly connected, for example, directly by welding to an automatic standpipe or water distributor 44 of the type described in the aforesaid French patent. This water distributor 44 is consequently capable of both vertical displacement by pivoting movement of the telescopic assembly around axle 41 and also axial displacement rearwardly by the travel of the tube 43 in the tube 42. This displacement is produced by a mechanical force or a hydraulic pressure prevailing in the interior of the tubes. In the absence of such action, tube 43 is held in the position shown in FIG. 2 under the action of two return springs 45 each connected at the front to the tube 42 and at the rear to the tube 43.

As disclosed in the aforesaid French patent, the base of the standpipe 44 has a ramp 46 inclined upwardly and towards the front with lateral portion 47 widening from rear to front to contact a flange on the hydrant and raise the standpipe 44 to a position in which the mouth thereof is just above the level of the upper extremity of the mouth piece of the hydrants 38 so that the standpipe 44 can be automatically engaged on the hydrant. When the standpipe 44 doesn't rest either directly or by its ramp on the mouthpiece of the hydrant, the tube 42 comes into abutment with the upper part of the cross brace 37 in order to avoid contact of the standpipe 44 with the pipe 11 which is constituted of a number of successive sections.

In accordance with the invention, a hydropneumatic accumulator 48 carried by the sled or carriage 32 is fixed either directly on the frames 33 or preferably through the intermediary of beams 49 on the front part of the tube 42. The accumulator is connected by a conduit, flexible in the first case and rigid in the second, to a hydraulic distributor 50 fixed to the tube 42. The hydraulic distributor has an intermediate position of equilibrium and two end positions in which it respectively engages one of two limit abutments 51 and 52, carried by a stem 53 which slides in a fork 54, for control of the distributor. The stem 53 is fixed at its rear extremity to any point on the standpipe 44 or the tube 43.

Figure 3:
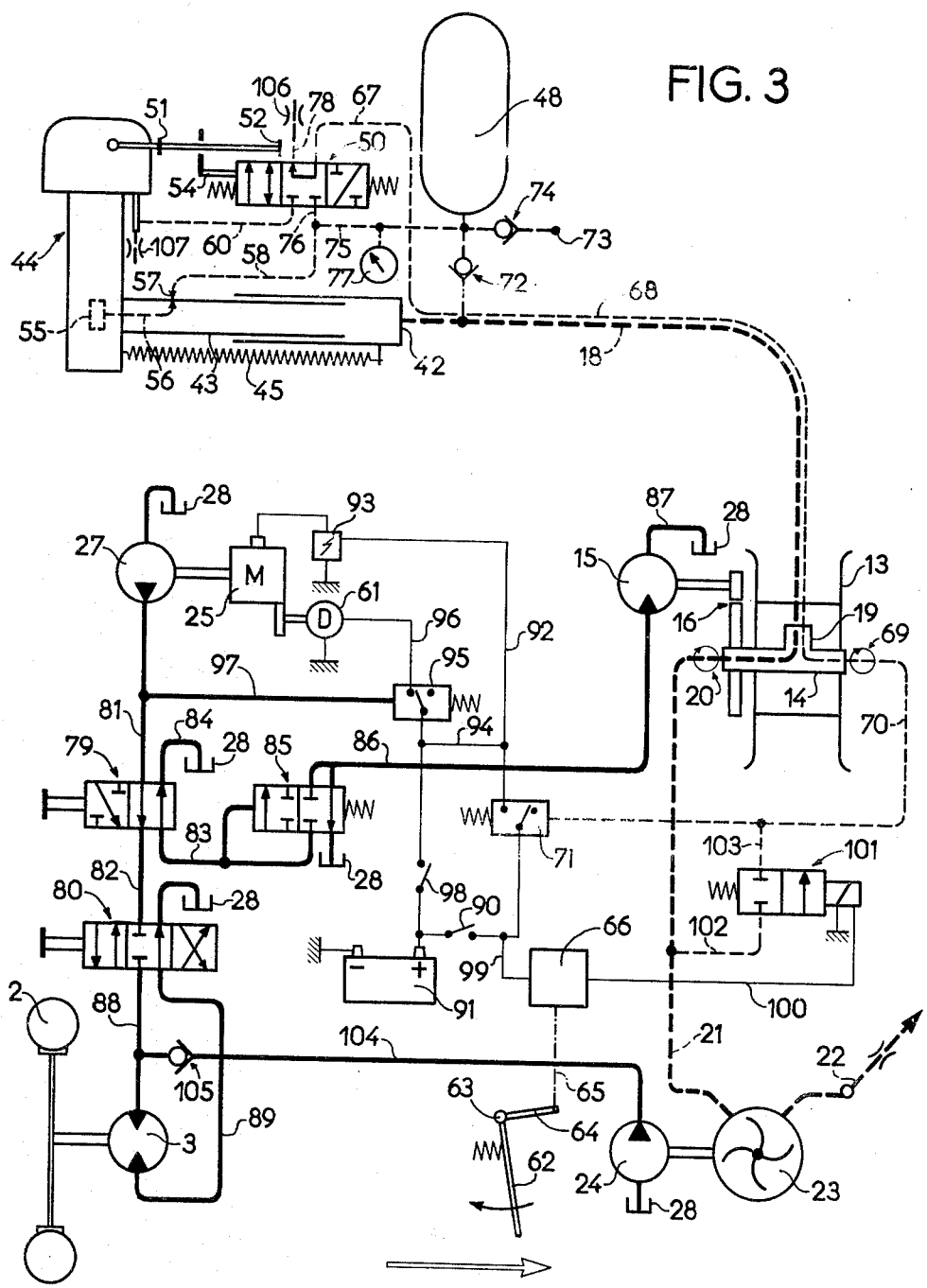
FIG. 3 is a schematic illustration of the details of the operation apparatus of the invention.

A hydraulic power distributor 55, shown in FIG. 3 and which is a portion of the automatic standpipe 44 in the manner as described in the aforesaid French patent, is connected to a flexible conduit 56 of relatively small diameter also shown in FIG. 3, which passes through the interior of the tube 43. The conduit 56 is connected to a coupling 57 traversing the wall of this tube. The coupling 57 is itself connected to the distributor 50 by a helicoidal plastic conduit 58 of small diameter disposed at the exterior of the telescopic assembly in such manner as to be capable of elongation when the telescopic tubes are extended. A lower hydraulic actuating jack for automatically releasing the standpipe 44 from a hydrant, as described in the aforesaid French patent is fed via an inlet 59, traversing the wall of the standpipe, to which is connected the distributor 50 by another conduit 60 similar to conduit 58.

The other details of construction which have not been shown in FIGS. 1 and 2 appear only in FIG. 3 and will be discussed in the course of the description of the operation of the apparatus. An exception to this is the electrical starter 61 for the engine 25 and a feeler 62 which is pivoted on the chassis 12 near the rear wheel 2 for movement around pin 63 and placed in such manner to contact the upper mouthpiece of the hydrants 38. The feeler comprises a projection 64 which acts through the intermediary of a mechanical control 65 on a switch of a timer 66 whose function will be described later.

All of the elements which have been described previously are connected together according to the diagrammatic illustration in FIG. 3 in which there is represented in heavy solid lines the hydraulic control circuit in which oil circulates while in heavy dotted lines there is shown the watering circuit in which circulates the water for spraying, the light dotted lines showing the hydraulic circuit for displacement actuation in which water circulates and finally in light solid lines there is shown the electrical circuit.

There is particularly shown in FIG. 3 a conduit of small diameter 67 which is part of the distributor 50 for connection to a coupling (not shown) traversing the wall of the tube 42 at the front extremity thereof so as to be in communication with a long flexible conduit 68 of small diameter placed in the interior of the flexible tube 18 over the entire length thereof, the other extremity of the tube 68 opening into the hollow shaft 14 by means of a rotatable joint 69 placed at the extremity of the shaft opposite the rotatable joint 20 wherefrom it is connected by a conduit 70 to a switch 71.

As seen in FIG. 3, the hydropneumatic accumulator 48 is in communication with the inlet of the conduit 18 through the intermediary of a one-way valve 72 as well as with auxiliary connection 73 via another one-way valve 74. It is additionally in communication directly through conduit 75 with the conduit 58, the two conduits 58 and 75 being connected to a single inlet 76 of the distributor 50. A control gauge 77 displays the interior pressure in the accumulator.

When the fork 54 of the distributor 50 is activated neither by the abutment 51 nor the abutment 52, the distributor 50 is in an intermediate position as shown in FIG. 3, which establishes by its central portion direct communication between 67 and a discharge line 78 to the atmosphere, the two other conduits 60 and 76 being blocked. When the standpipe 44 is neither subjected to mechanical or hydraulic action, the telescopic tube 43 is retracted under the action of the spring 45 and the abutment 51 activates the distributor towards the right which by its left portion puts into respective communication the conduit 60 with the atmosphere via 78 and the conduit 76 with the conduit 67. Finally, when a hydraulic pressure is established in the interior of the telescopic assembly to place the same in its position of maximum extension, the abutment 52 acts on the distributor 50 towards the left in FIG. 3 which by its right portion permits direct communication between conduit 67 and conduit 60, the two other conduits being blocked.

Placed on the vehicle on front of the seat 8 for the operator, are two manually operated distributors 79 and 80 connected as shown in the schematic arrangement in FIG. 3. The distributor 79 has two positions of which the rest position is shown in the drawing which establishes communication between hydraulic conduit 81 connected to the outlet of hydraulic pump 27 and an intermediate conduit 82 while at the same time effecting communication between a conduit 83 and a conduit 84 for discharge to the reservoir. The conduit 83 is connected to a hydraulic device 85 which operates when the pressure is established in conduit 83 to distribute this pressure to the feed conduit 86 for the hydraulic motor 15 whose return is directly made by conduit 87 to the discharge reservoir 28 and when no pressure is established in conduit 83, to cut the connection between 83 and 86 and to establish connection between 86 and the discharge reservoir 28 which corresponds to the rest position represented in FIG. 3. When the distributor 79 is manually activated to the right in the drawing, for example, by means of conventional levers, it establishes at its left portion the connection of conduits 81 and 83 which has the effect of activating the motor 15 which drives the reel 13 in the direction of winding of the conduit 18. When the distributor 79 is in its rest position shown in FIG. 3, the feed of motor 15 is interrupted but this remains capable of freely turning in the opposite direction under the tractive effect of unwinding of the conduit 18 while suctioning the oil through conduit 87 from the reservoir 28 and feeding it back by conduit 86 to the discharge of the distributor 85 which can comprise a discharge valve or an adjustable restriction in order to adjust the tension in the unwound conduit 18.

In this rest position, the distributor 79 also directly pressurizes via the conduit 82 the second distributor 80 which has three positions of which one is to the right in FIG. 3 which establishes by the left portion communication between the conduit 82 and the conduit 88 which feeds the motor 3 in the direction to produce forward travel of the vehicle, the other conduit 89 serving for return connection and being put into communication by the left chamber with the discharge reservoir 28. When the distributor 80 is activated in the opposite direction, that is, towards the left in the drawing, this will produce by the right portion the connection of the pressure inlet 82 with the conduit 89 which produces consequently drive of the motor 3 in the direction of reverse travel, the conduit 88 being in turn connected to the discharge reservoir 28. Finally, in the intermediate position which is the rest position illustrated in the drawing, the feed of conduit 88 is interrupted, but the communication between 89 and the discharge remains established.

At the start of movement of the watering vehicle, the accumulator 48 normally remains under pressure from the preceding watering, and the distributor 50 activated by the abutment 51, estalishes by the left chamber the communication between conduits 76 and 67, which has for its effect to convey the pressure from the hydraulic accumulator by 67, 68, 69 and 70 to the switch 71 which thereby closes the circuit. The operator then sits on the seat 9 and closes the normal ignition switch 90, which passes current from the battery 91 through the intermediary of the closed switch 71 both to the lead 92 feeding the ignition apparatus 93 of the engine and by lead 94 and a second switch 95, the electrical lead 96 for feeding the starter 61, or more exactly, the control solenoid of the starter. The engine 25 is then started and drives the pump 27. At the time when starting is achieved, the pressure established in the conduits 81 and 97 activates the switch 95 in a direction to open the circuit in order to cut the feed of the starter, the feed of the ignition apparatus continuing to be made.

The distributor 79 being in the position of rest, the operator can then drive the vehicle by shifting the distributor 80 forwardly or rearwardly, and while controlling the direction of travel through the steering wheel 7. The boom 9 is raised during this time to an inoperative position by means of a lifting apparatus (not shown).

In the case where the hydraulic accumulator 48 was accidentally emptied after the previous use, the switch 71 does not permit the starting of the engine. In this case, there is provided a safety switch 98 which permits shunting the assembly of 90 and 71 to obtain starting of the engine in the same manner as described previously, in order to be able to drive the vehicle up to the closest water hydrant where the operator can refill the accumulator 48 by connecting this hydrant to the auxiliary branch conduit 73. The operator can then open the safety switch 98 and perform the normal operation as previously described.

The operator drives the vehicle up to a trestle on the pipe 11 corresponding to the region to be watered and which can either be fixed or demountable but installed beforehand. When the vehicle is in place on the pipe, the operator lowers the boom 9 to place the guide wheels 10 on opposite sides of the pipe 11 to thereafter automatically assure the direction of travel. The operator thereafter only has to activate the distributor 80 in the direction for forward travel until the feeder 62 contacts the first hydrant 38.

At this moment, the transmission 65 activates the switch of timer 66, which switch can either be mechanical or hydraulic and in either case has a return spring which is overcome by the force of the traction of the feeler. Or, still further, the switch can be electrical, the feeler then only closing an electrical switch. The timer has the function after a first predetermined time interval, measured either from the time of activation by the feeler or from its release, to establish over a second predetermined time interval the closure of a circuit between a current input 99 provided with ignition switch 90 and an electrical lead 100 feeding an electrovalve 101 which establishes direct passage between a conduit 102 connected to the main watering conduit 21 and a conduit 103 directly connected in parallel to conduit 70.

Naturally, in this operation, all of the conduit 18 is wound on the reel 13 such that the sled or carriage 32 directly follows behind the first vehicle. The automatic standpipe 44 raised by the ramp 46 automatically comes into engagement on the mouthpiece of the hydrant which the front vehicle has just passed this being produced prior to the completion of the first time interval of the timing switch, as will be seen later, since the advancement of the vehicle by manual drive under the action of the engine is more rapid than that corresponding to the watering.

When the standpipe 44 is automatically engaged on the mouthpiece of the hydrant as described in the aforesaid French patent, and due to the feed from the distributor 55 assured by the hydraulic accumulator 48, the vehicle continues to advance producing an elongation of the springs 45 and thereby freeing the abutment 51 and the fork 54 from the distributor 50 to allow it to return to its central rest position in which it connects the conduit 67 to the discharge 78 causing the pressure in 70 to drop which immediately stops the engine 25 by the switch 71, and thereby also halts the vehicle. When the engine is stopped, the operator should then return the distributor 80 to its intermediate position shown in FIG. 3, and place the distributor 79 in its active position by displacing it to the right in FIG. 3. Then he can leave the vehicle which will hereafter operate in an entirely automatic manner.

In fact, the engagement of the standpipe 44 on the hydrant 38 has the effect of automatically activating the hydraulic connection of the standpipe and thereby the feed of the conduit 18 which is progressively filled. In this time, late operation of the electrovalve 101 under the effect of the timer has no effect whatsoever, since it connects the two conduits 21 and 70 without pressure. When the conduit 18 is entirely filled with water, this feeds by 20 and 21 the watering apparatus 22 with passage through the turbine 23 which has the effect of driving the pump 24 and thereby directly feeding by 104 the conduit 88 through the intermediary of a one-way valve 105, the return conduit 89 being normally maintained open as explained previously. Naturally, the speed of advance of the vehicle under the effect of this hydraulic drive is much more reduced than that before to permit a sufficient watering operation. It is easily seen that this speed is automatically proportioned to the discharge of the water for irrigation but it can also be regulated in order to adjust, as desired, the amount of water deposited per square meter. In current practice and to give some concept of the magnitudes involved, this speed is of the order of 30 cm./minute.

There passes therefore, a time as long (of the order of 5 hrs.) during which the watering vehicle proceeds along the length of the pipe 11 while unwinding behind it the conduit 18 connected to the hydrant 38.

Before the conduit has been entirely unwound, the front vehicle has reached a new hydrant 38 and when its feeler 62 is activated by this hydrant, the timer 70 begins to count the first predetermined time interval indicated hereinabove. This is calculated such that the vehicle has had time to travel past the hydrant 38 over a sufficient distance corresponding at least to the length of the sled 32, that is to say about 2 meters. It is seen therefore that the first time interval of the timer will be adjusted for safety purposes for about 10 minutes with the indicated speed, the time being able to be adjusted as a function of this speed or singularly fixed as a function of the minimum speed while simply providing several extra meters of conduit 18 for security. The low precision required for this timer allows the use for example, of a simple thermal relay.

Under these conditions after the vehicle has passed 2 to 3 meters from the hydrant 38, the timer 66 establishes during the second indicated time interval the feed of the electrovalve 101 which has the effect of sending water pressure from the conduit 21 to the conduit 70 and through the small flexible conduit 68 inside conduit 18 to the conduit 67. Since at this moment, the tube 42 is under pressure, the right portion of the distributor 50 puts conduit 67 into communication with conduit 60. This pressure is then communicated to a jack of the automatic pawl release mechanism such that the standpipe 44 is mechanically freed from the hydrant and is vigorously pushed upwardly by the water pressure, this movement permitted by the pivot connection 41. At the same time the standpipe is pulled forwardly by the springs 45 which is also permitted due to the immediate drop of pressure in the interior of the telescopic assembly. At the same time that the conduit 103 supplies the pressure fluid towards the sled to obtain the indicated effect, there is also effected on the vehicle the action of the switch 71 and thereby the starting of engine 25. The regulation of the second time interval of the timer is therefore adjusted not only to permit the complete activation of the release jack but also to permit the assurance of the continuity of action of the switch 71. In addition, to avoid an instantaneous drop in pressure at the time of passage of the central portion distributor 50 into operative position, there can be provided a time delay for the switch 71 or more simply a throttle 106 on the discharge conduit 78. The time of movement of the action of the jack and the retraction of the telescopic assembly only takes 3 to 4 seconds and this is why the second time interval which is the time for establishing current in the electrovalve 101 is chosen for security of the order of 5 to 6 seconds in such a manner that the right portion of the distributor 50 should come to establish direct communication between conduits 76 and 67 to permit the feed of the switch 71 by the hydropneumatic accumulator 48 before the electrovalve 101 doesn't eliminate this pressure thereby assuring the indicated continuity. The low precision necessary for the second time interval also permits the use of a second thermal relay. Furthermore it is seen that the passage of the central portion of the distributor 50 to operative position has the effect of connecting the conduit 50 to discharge and consequently the release jack. However, this position is of short duration and when the right portion of the distributor is operative, the jack, the conduits 60, 67, 70 as well as 103 blocked by 101, and the switch 71 are entirely closed without possible discharge. It is therefore necessary to avoid subsequent pressurization due to leakage at the electrovalve 101 or at the distributor 50 which would untimely activate the release jack. This can be obtained in a very simple manner by providing a second throttle 107 of low value between the conduit 60 and the atmosphere. Naturally, the leakage through throttle 107 should be sufficiently low in order not to prevent the establishment of pressure and the control of the jack when the conduit 103 is fed by the electrovalve 101.

Since the feed of the conduit 21 has stopped, the watering is stopped, while at the same time the turbine 23 is no longer driven and the vehicle also stops which permits assurance of the continuity of watering in the space as described previously. On the other hand, the engine 25 continues to operate, due to the establishment of the pressure on the switch 71 by the oil through 81 and 79 through the conduit 83 to drive the reel in the direction of the winding in order to pull the sled 32. This operation can be effected in any time whatever, but naturally as short as possible.

It is suitable to note that when the reel 13 pulls the conduit 18 and the sled 32, the vehicle cannot move back due to the mechanical irreversability of the reducer 4 and the hydraulic irreversibility of the motor 3 since the rearward travel would require compressing the oil in the conduit 88 which is blocked by 80 as well as by the one-way valve 105.

When the standpipe 44 has contacted a new hydrant 38 this produces the same effect as at the time of travel since now the sled is displaced under the effect of the traction of the reel and not under the effect of the displacement of the vehicle. In particular there is obtained automatic engagement of the hydrant and the stoppage of the engine by the opening of the switch 71. Then after the necessary time for filling the conduit 18, which can be empty at least partially, there is obtained a new drive of the turbine and thereby of the vehicle and the watering consequently recontinues there where it has preceedingly stopped.

It is therefore seen that in sections of successive 100 meters, without this value being limitative, one can easily water and in absolutely automatic manner, a plurality of kilometers of terrain over a width corresponding to two times the range of the watering apparatus such that the device can operate for several hours and even if needed several days without surveillance. It is also seen that the apparatus is relatively simple and that it is easily used and in addition the great spacing permitted between the hydrants 38 allows a relatively economical installation of the feed pipe 11.

According to a modification, the sled and consequently the standpipe 44 could be axially secured not by the tube 42 of the telescopic assembly, but by the tube 43 without this modifying the preceeding operation.

Numerous other variations and modifications will now become evident to those skilled in the arts without departing from the scope and spirit of the invention as defined in the appended claims.

What is claimed is:

1. In watering apparatus of the type in which a first vehicle travels along a pipe having hydrants spaced therealong, the vehicle having a rotatable reel on which a first flexible conduit is wound, the conduit having one end fixed to the vehicle with a spraying device thereon, the other end of the conduit extending rearwardly of the vehicle and being connected to a standpipe carried by the sled and adapted for being releasably engaged with a hydrant so that water under pressure in the hydrant can be delivered to the conduit and the spraying device, the improvement comprising a hydropneumatic accumulator coupled with the standpipe for receiving a supply of water under pressure, drive means on said vehicle for driving the reel in rotation such that with the vehicle at rest the sled is pulled towards the vehicle by winding of the flexible conduit on the reel, operating means coupled to the accumulator, the drive means and the standpipe for halting the vehicle after it has traveled past a hydrant, then releasing the standpipe on the sled from a previous hydrant with which it is engaged, thereafter driving the drive means to wind the conduit on the reel and pull the sled towards the now stopped vehicle and wherein said operating means further includes a second flexible conduit of relatively small diameter disposed in the interior of the first said flexible conduit along the entire length thereof, a distributor means having three operative positions and coupled with said first conduit such that upon forward movement thereof relative to the standpipe the second conduit is operatively connected in one position of the distributor means to effect release of the standpipe from the hydrant, in a second position of the distributor means to the atmosphere and in a third position of the distributor means to a switch means for controlling starting of the drive means.

2. The apparatus as claimed in claim 1 wherein said operating means further includes a telescopic assembly of two tubes the first being coupled to the first conduit, the second to the standpipe, said distributor means being mounted on the first tube, spring means connecting the second tube to the standpipe and means pivotably connecting the first tube to the sled.

3. The apparatus as claimed in claim 1 wherein said operating means further includes a feeler means coupled to said vehicle and activated by passage on a hydrant, a timer means operatively coupled to said feeler means to actuate after a fist given time interval an electrovalve means for putting the first conduit into communication with the pipe and said switch means.

4. The apparatus as claimed in claim 1 wherein said control device includes a hydraulic pump, a first distributor fed by said hydraulic pump to effect auxiliary drive of the reel while providing free reverse rotation thereof, and a second distributor coupled to the drive means for driving the same forwardly or rearwardly when the latter is operatively coupled to the vehicle, said distributor means then being in said second position, said turbine then being decoupled from the vehicle.

5. The apparatus as claimed in claim 1 wherein said drive means includes an engine, said operating means further including an electrical circuit with an ignition switch for said engine.

6. The apparatus as claimed in claim 5 wherein said operating means further includes a first hydraulic pump driven by said engine a hydraulic drive motor for auxiliary drive of the reel, a first distributor coupled to the pump and drive motor to operatively couple the same in driving relation while providing reverse rotation of the motor when no pressure is present, a second hydraulic motor for driving the vehicle in opposite directions, a second distributor for manually controlling the coupling of the second hydraulic motor and the pump, and a second pump driven by said turbine, said second distributor having an intermediate position in which the second motor is disconnected from the first said pump and is driven by the second pump only forwardly.

7. The apparatus as claimed in claim 6 further comprising a first contact for feeding said switch means to operate the ignition circuit of the engine, a second contact operated by said first pump for interrupting drive of the engine and a safety switch for shunting the first contact to effect operation of the vehicle when the accumulator is empty.

* * * * *